US011169049B2

(12) United States Patent
Mathey et al.

(10) Patent No.: US 11,169,049 B2
(45) Date of Patent: Nov. 9, 2021

(54) METHOD FOR EVALUATING COSMETIC DEFECTS OF AN OPTICAL DEVICE

(71) Applicant: Essilor International, Charenton-le-Pont (FR)

(72) Inventors: Pascal Mathey, Charenton-le-Pont (FR); Dominique Leguy, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/757,167

(22) PCT Filed: Oct. 22, 2018

(86) PCT No.: PCT/EP2018/078932
§ 371 (c)(1),
(2) Date: Apr. 17, 2020

(87) PCT Pub. No.: WO2019/077166
PCT Pub. Date: Apr. 25, 2019

(65) Prior Publication Data
US 2020/0240871 A1 Jul. 30, 2020

(30) Foreign Application Priority Data

Oct. 20, 2017 (EP) ..................................... 17306445

(51) Int. Cl.
*G01M 11/02* (2006.01)
*G01N 21/88* (2006.01)
(Continued)

(52) U.S. Cl.
CPC ..... *G01M 11/0278* (2013.01); *B29D 11/0098* (2013.01); *G01N 21/8851* (2013.01); *G01N 21/958* (2013.01)

(58) Field of Classification Search
CPC .......... G01M 11/0278; B29D 11/0098; G01N 21/8851; G01N 21/958
(Continued)

(56) References Cited

U.S. PATENT DOCUMENTS

| 3,988,068 A | * | 10/1976 | Sprague | ............. | G01M 11/0278 356/124 |
| 2007/0139640 A1 | * | 6/2007 | Biel | ........................ | G01M 11/02 356/124 |

(Continued)

FOREIGN PATENT DOCUMENTS

| DE | 19935843 A1 | 2/2000 |
| EP | 1116550 A1 | 7/2001 |

(Continued)

OTHER PUBLICATIONS

International Search Report, dated Jan. 18, 2019, from corresponding PCT application No. PCT/EP2018/078932.
(Continued)

*Primary Examiner* — Isiaka O Akanbi
(74) *Attorney, Agent, or Firm* — Nixon & Vanderhye

(57) ABSTRACT

Disclosed is a method for evaluating cosmetic defects of an optical device, including: a first step of acquiring a first set of cosmetic defects of the optical device; a second acquiring step during which a second set of cosmetic defects of the optical device is acquired, the second set of cosmetic defects being different from the first set of cosmetics defects and including at least one cosmetic defect corresponding to a cosmetic defect of the first set of cosmetic defects; a determining step, during which a subset of the first set of cosmetic defects of the optical device is determined based on the comparison of the cosmetic defects of the second set of cosmetic defects and the cosmetic defects of the first set of cosmetic defects; and a determining step, during which a (Continued)

quality factor of the optical device is determined based on the subset of cosmetic defects.

16 Claims, 4 Drawing Sheets

(51) Int. Cl.
  *B29D 11/00* (2006.01)
  *G01N 21/958* (2006.01)
(58) Field of Classification Search
  USPC .......................... 356/124–127, 237.1–237.6
  See application file for complete search history.

(56) References Cited

U.S. PATENT DOCUMENTS

| | | | | |
|---|---|---|---|---|
| 2007/0146687 | A1* | 6/2007 | Divo | G01M 11/0228 356/124 |
| 2009/0213322 | A1* | 8/2009 | Urabe | G02B 1/11 351/44 |
| 2014/0091016 | A1* | 4/2014 | Biel | G01M 11/0271 209/586 |
| 2014/0092395 | A1* | 4/2014 | Fechner | B29D 11/0098 356/517 |

FOREIGN PATENT DOCUMENTS

| | | |
|---|---|---|
| JP | 2014-219618 A | 11/2014 |
| WO | 2007/060173 A1 | 5/2007 |
| WO | 2016/055861 A1 | 4/2016 |

OTHER PUBLICATIONS

Written Opinion, dated Jan. 18, 2019, from corresponding PCT application No. PCT/EP2018/078932.

* cited by examiner

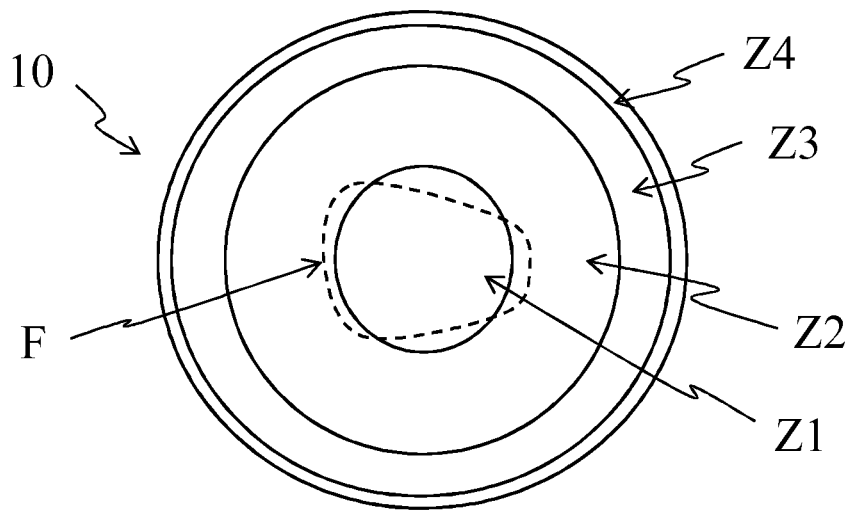
Figure 5
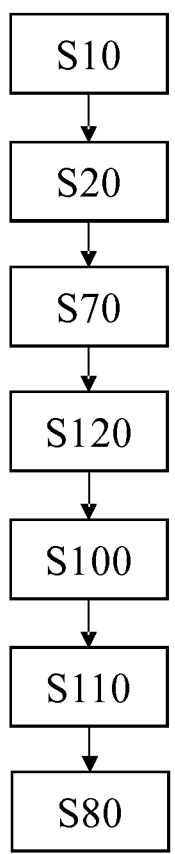
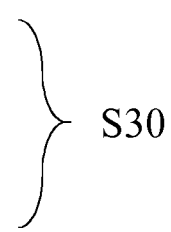
Figure 6
Figure 7

METHOD FOR EVALUATING COSMETIC DEFECTS OF AN OPTICAL DEVICE

FIELD OF THE INVENTION

The invention relates to a method for evaluating cosmetic defects of an optical device.

The invention further relates to method for sorting an optical device according to a quality score determined according to the method for evaluating cosmetic defects of an optical device.

BACKGROUND OF THE INVENTION

Usually, the quality of an optical device is controlled either with a human's eye or with an automatic vision system.

However, the control of the quality of an optical device with a human's eye is expensive, takes time and needs significant human resources.

Further, the usual automatic vision systems are not able to consider only relevant cosmetic defects during cosmetic inspection of the optical device with good accuracy and repeatability like the eye of a trained operator.

Thus, there is a need for a method which allows the evaluation of the cosmetic defects of an optical device in order to sort the optical device based on the detected cosmetic defects.

One object of the invention is to provide such method.

SUMMARY OF THE INVENTION

To this end, the invention proposes a method for evaluating cosmetic defects of an optical device, the method comprising:
- a first set of cosmetic defects acquisition step also called first acquisition step, during which a first set of cosmetic defects of the optical device is acquired,
- a second set of cosmetic defects acquisition step also called second acquisition step distinct from the first acquisition step, during which a second set of cosmetic defects of the optical device is acquired, the second set of cosmetic defects being different from the first set of cosmetic defects and comprising at least one cosmetic defect corresponding to a cosmetic defect of the first set of cosmetic defects,
- a subset of cosmetic defects determining step, during which a subset of the first set of cosmetic defects of the optical device is determined based on the comparison of the cosmetic defects of the second set of cosmetic defects and the cosmetic defects of the first set of cosmetic defects, and
- a quality factor determining step, during which a quality factor of the optical device is determined based on the subset of cosmetic defects.

The quality factor determining step may comprise, as described below, a number of criterion. However, it is still within the purpose of the invention to have a quality factor determining step consisting in a simple "acceptance or fail" test, determined automatically or by input of an operator. The invention enables to take into account that some cosmetic defects may not be relevant for a final, cleaned, optical device, and that the quality factor determining step would be more accurate by taking into account that those defects are cosmetic defects that will not be relevant for the end product.

Advantageously, the method for evaluating cosmetic defects of an optical device of the invention allows the detection of all the cosmetic defects of an optical device with accuracy and the evaluation of the cosmetic defects of the optical device to determine if the cosmetic defects of the optical device are acceptable or not, so that the optical device may be manufactured and/or machined, for instance, into an ophthalmic lens.

The method for evaluating cosmetic defects of an optical device of the invention allows determining the cosmetic quality of the optical device prior to the manufacturing or the machining the optical device, for instance into an ophthalmic lens.

Moreover, the method for evaluating cosmetic defects of an optical device of the invention enables to select the right cosmetic defects to be judged for their critical impact on the quality factor of an optical device, thus reducing the human error in judging the quality factor of an optical device. In a further use it may even allow an automatization of the control of the quality of an optical device. Such control is advantageously accurate and repeatable.

Furthermore, the invention enables to complement the usual automatic vision systems which are not able to consider only relevant cosmetic defects during cosmetic inspection of the optical device with good accuracy and repeatability like the eye of a trained operator. For instance, as described below, an automatic system using the invention is able to exclude cosmetic defects on a back surface of a semi-finished optical lens, or to exclude cosmetic defects which are removable through cleaning of the optical device such as dusts, or to exclude cosmetic defects out of the final edging zone of the optical device, while keeping into account critical cosmetic defects. In other words, the invention enables to automatically take into account that some cosmetic defects will not be relevant for a final, cleaned, optical device. This is then enabled either by removing such defects from a quality control analysis, or by limiting the contribution of such defects to a quality score of the optical device.

According to embodiments, the methods for evaluating cosmetic defects of an optical device according to the invention may further comprise one or several of the following features according to any possible combination:
- previous to the first set of cosmetic defects acquisition step, the method comprises:
  - an optical device image providing step, during which at least one image of the optical device is provided,
  - during the first set of cosmetic defects acquisition step, the first set of cosmetic defects is acquired on the at least one image of the optical, and optionally
  - during the second set of cosmetic defects acquisition step, the second set of cosmetic defects is acquired on the at least one image of the optical; and/or
- previous to the first set of cosmetic defects acquisition step, the method comprises:
  - an optical device providing step, during which an optical device is provided,
  - an optical device image acquisition step, during which at least one image of the optical device is acquired,
  - during the first set of cosmetic defects acquisition step, the first set of cosmetic defects is acquired on the at least one image of the optical, and optionally
  - during the second set of cosmetic defects acquisition step, the second set of cosmetic defects is acquired on the at least one image of the optical; and/or
- the optical device comprises at least a first surface and a second surface, the method comprises a cosmetic defects surface location differentiating step, during which cosmetic defects of the first and second sets of cosmetic defects are differentiated based on the location of cosmetic defects on the first and/or second surface of the optical device, the second set of cosmetic defects comprising only cosmetic defects located on one of the first or second surfaces, and wherein the subset of the first set of cosmetic defects of the optical device is determined based on the subtracting of the differentiated cosmetic defects of the second set of cosmetic defects from the differentiated cosmetic defects of the first set of cosmetic defects; and/or during the cosmetic defects surface location differentiating step, the cosmetic defects of the first and second sets of cosmetic defects are differentiated with measurements on the optical device; and/or the method comprises a cosmetic defects type differentiating step, during which cosmetic defects of the first and second sets of cosmetic defects are differentiated based on the type of cosmetic defects of the optical device, the second set of cosmetic defects comprising only cosmetic defects of a predetermined type of cosmetic defects, and wherein the subset of the first set of cosmetic defects of the optical device is determined based on the subtracting of the differentiated cosmetic defects of the second set of cosmetic defects from the differentiated cosmetic defects of the first set of cosmetic defects; and/or the method comprises a cosmetic defects position differentiating step, during which cosmetic defects of the first set of cosmetic defects are mapped and differentiated based on the position of cosmetic defects on the optical device, and wherein the quality factor of the optical device is determined based at least on the position of the cosmetic defects on the optical device; and/or during the cosmetic defects type differentiating step, the cosmetic defects of the first and second sets of cosmetic defects are differentiated with image processing and/or with measurements on the optical device; and/or the type of cosmetic defects of the optical device relates to a scratch on a surface of the optical device and/or to a spread defect on the optical device and/or a varnish drop on the optical device and/or a varnish wave on the optical device and/or an internal defect of the optical device and/or a polarized mark on the optical device and/or a concentric streak on the optical device and/or a fiber on the optical device and/or a dirty insert on the optical device and/or a handling scratch on the optical device and/or a water mark on the optical device and/or to a crater on the optical device and/or a black point on the optical device and/or a dust on the optical device; and/or the method comprises a cosmetic defects position differentiating step, during which cosmetic defects of the first and second sets of cosmetic defects are differentiated based on the position of cosmetic defects on the optical device, the second set of cosmetic defects comprising only cosmetic defects positioned on a predetermined zone of the optical device, and wherein a subset of the first set of cosmetic defects of the optical device is determined based on the subtracting of the differentiated cosmetic defects of the second set of cosmetic defects from the differentiated cosmetic defects of the first set of cosmetic defects; and/or during the cosmetic defects position differentiating step, the cosmetic defects of the first and second sets of cosmetic defects are differentiated with image processing; and/or the position of the cosmetic defects on the optical device is determined relative to the optical center of the optical device and/or to the geometrical center of the optical device and/or to markings on the optical device and/or on a prismatic reference point of the optical device; and/or an optical lens is to be manufactured and/or machined on the optical device and is intended to be mounted on a frame, the method comprises a frame data providing step, during frame data relative at least to the position of the frame on the optical device and/or the shape of the frame are provided, and wherein a subset of the first set of cosmetic defects of the optical device is further determined based on the frame data; and/or the optical device comprising at least first and second surfaces, wherein the quality factor depends on the location of the cosmetic defects on the first and/or second surfaces of the optical device and/or on the position of the cosmetic defects on the optical device and/or on the size of the cosmetic defects of the optical device and/or on the type of the cosmetic defects of the optical device and/or on the shape of the cosmetic defects of the optical device and/or on the intensity of the cosmetic defects of the optical device and/or the number of cosmetic defects of the optical device and/or the size or intensity of the cosmetic defects of the optical device within said zone; and/or the optical device is divided into zones, and for each zone of the optical device, the method further comprises a quality score determining step, during which a quality score of the zone of the optical device is determined based on the cosmetic defects of the zone of the optical device; and/or the quality score of the zone of the optical device depends on the size of the cosmetic defects of the optical device within said zone and/or on the type of the cosmetic defects of the optical device within said zone and/or on the shape of the cosmetic defects of the optical device within said zone and/or on the intensity of the cosmetic defects of the optical device within said zone and/or the number of cosmetic defects of the optical device within said zone and/or the size or intensity of the cosmetic defects of the optical device within said zone; and/or the quality factor of the optical device being intended to be compared with a predetermined quality factor threshold, the method comprises a cosmetic defects number determining step, during which the number of cosmetic defects of the optical device is determined, and wherein the quality factor and/or the predetermined quality factor threshold depends on the determined number of cosmetic defects of the optical device; and/or the quality factor of the optical device being intended to be compared with a predetermined quality factor threshold, the method comprises a cosmetic defects cluster determining step, during which the number of cosmetic defects of the optical device closer from each other than a predetermined distance value is determined, and wherein the quality factor and/or the predetermined quality factor threshold depends on the determined number of cosmetic defects of the optical device; and/or the method comprises a markings acquisition step, during which markings of the optical device are acquired, and wherein the subset of cosmetic defects of the optical device is further determined based on the subtracting of the markings of the optical device from the cosmetic defects of the first set of cosmetic defects; and/or the optical device is a spectacle lens, preferably an ophthalmic lens, and more preferably a semi-finished lens; and/or the optical device is tinted and/or polarized and/or uncoated.

It is to be noted that the steps needed and their order of application may be adapted to the specific needs of the user or customer using the process of the invention. On specific cases, a human operator may also accomplish some of the steps, for example a final control or determining if the optical devices passes or fails. Further, for a given industry, for example in the manufacturing of spectacle lenses, the predetermined quality factor threshold may also be adapted depending on different customer needs. Indeed, depending on the cosmetic quality required by each customer, some lenses which do not satisfy the needs for a first customer may be allowed for a second customer.

The different steps of the method for evaluating cosmetic defects of an optical device according to the invention may be carried out in any order.

Moreover, only some steps of the method for evaluating cosmetic defects of an optical device according to the invention may be carried out. In other words, not all the steps of the method for evaluating cosmetic defects of an optical device according to the invention need to be carried out.

Some combination of steps of the method for evaluating cosmetic defects of an optical device according to the invention, in a specific order, allow advantageously having a precise and quick evaluation of the cosmetic defects of the optical device. Of course, other combination of the steps of the method for evaluating cosmetic defects of an optical device according to the invention, in another order, may be carried out.

The invention further relates to a method for sorting an optical device, the method comprising:
- a predetermined quality factor threshold providing step, during which a predetermined quality factor threshold is provided,
- a quality factor determining step, during which a quality factor of an optical device is determined according to any of the methods for evaluating cosmetic defects of an optical device of the invention,
- a comparing step, during which the quality factor of the optical device is compared with the predetermined quality factor threshold, and
- a sorting step, during which the optical device is sorted based on the comparison of the quality factor of the optical device and the predetermined quality factor threshold.

Advantageously, the method for sorting an optical device of the invention allows sorting optical devices based on the cosmetic quality of the optical devices prior to the manufacturing or the machining the optical devices, for instance, into ophthalmic lenses.

According to embodiments, the method for sorting an optical device according to the invention may further comprise one or several of the following features according to any possible combination:

the method further comprises a decision step, during which a decision is stated if the optical device is accepted or rejected; and/or the predetermined quality factor threshold is determined according to the method for evaluating cosmetic defects of an optical device of the invention; and/or the method comprises:
- an optical lens virtual position determining step, during which a virtual position of an optical lens, having a shape adapted to be fitted in a predetermine frame, to be manufactured and/or machined on the optical device is determined based on the determined cosmetic defects on the optical device,
- a sorting step, during which the optical device is sorted based on the determined virtual position of the optical lens to be manufactured and/or machined on the optical device, and optionally
- a decision step, during which a decision is stated if the optical device is accepted or rejected; and/or during the decision step, the decision if the optical device is accepted or rejected is manually stated; and/or the positioning of the sorted optical device is a 2-Dimensional or a 3-Dimensional positioning.

The invention further relates to a method for manufacturing an optical device, the method comprises:
- the steps of a method for sorting an optical device according to the invention,
- an optical device positioning step, during which the sorted optical device is positioned on a blocking device for machining and/or surfacing based on the determined virtual position of an optical lens to be manufactured and/or machined on the optical device, and
- a machining and/or surfacing step, during which the positioned sorted optical device is machined and/or surfaced according to the determined virtual position of an optical lens to be manufactured and/or machined on the optical device.

The invention further relates to a computer program product comprising one or more stored sequences of instructions that are stored, for instance, on a non-transitory computer memory, and that are accessible to a processor and which, when executed by the processor, causes the processor to carry out the steps of the method for evaluating cosmetic defects of an optical device according to the invention.

The invention further relates to a computer readable storage medium having a program recorded thereon, where the program makes the computer execute the steps of the method for evaluating cosmetic defects of an optical device according to the invention.

The invention further relates to a computer readable medium comprising one or more stored sequences of instruction of a computer program product, wherein the one or more sequences of instructions are accessible to a processor and which, when executed by the processor, causes the processor to carry out the steps of the method for evaluating cosmetic defects of an optical device according to the invention.

The invention further relates to a computer program product comprising one or more stored sequences of instructions that are stored, for instance, on a non-transitory computer memory, and that are accessible to a processor and which, when executed by the processor, causes the processor to carry out the steps of the method for sorting an optical device according to the invention.

The invention further relates to a computer readable storage medium having a program recorded thereon, where the program makes the computer execute the steps of the method for sorting an optical device according to the invention.

The invention further relates to a computer readable medium comprising one or more stored sequences of instruction of a computer program product, wherein the one or more sequences of instructions are accessible to a processor and which, when executed by the processor, causes the processor to carry out the steps of the method for sorting an optical device according to the invention.

The invention further relates to a machine for managing cosmetic defects on an optical device comprising:
   an optical device cosmetic defect acquisition module configured to acquire a first set of cosmetic defects and a second set of cosmetic defects of the optical device,
   a link with an analytical module configured to apply the method for evaluating cosmetic defects of an optical device according to the invention or the method for sorting an optical device according to the invention.

The invention further relates to a system for managing cosmetic defects on an optical device comprising:
   a machine comprising an optical device cosmetic defect acquisition module configured to acquire a first set of cosmetic defects and a second set of cosmetic defects of the optical device, and
   an analytical module configured to apply the method for evaluating cosmetic defects of an optical device according to the invention or the method for sorting an optical device according to the invention and adapted to determine a quality factor of the optical device.

Unless specifically stated otherwise, as apparent from the following discussions, it is appreciated that throughout the specification discussions utilizing terms such as "computing", "calculating", "processing" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including an application specific integrated circuit (ASIC), floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below.

In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Other characteristics and advantages of the invention will become more apparent from the claims and from the following description of some embodiments given by way of example without limitation with reference to the drawings, in which:

FIG. 5 represents an optical device divided into zones, FIGS. 6 and 7 are flowcharts of the different steps of a method for evaluating cosmetic defects of an optical device according to the invention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

Figure 1:
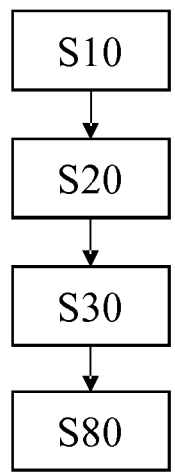
FIGS. 1 to 4 are flowcharts of the different steps of a method for evaluating cosmetic defects of an optical device according to the invention.

The invention relates to a method for evaluating cosmetic defects of an optical device. The method may be implemented by computer means. A flowchart of the different steps of the method for evaluating cosmetic defects of an optical device according to the invention is represented in FIG. 1.

The present invention can be used in all kinds of optical devices. An optical device may be such as optical lenses and optical blocks, and in particular ophthalmic elements and devices. Non-limiting examples of ophthalmic elements include corrective and non-corrective lenses, including single vision or multi-vision lenses, which may be either segmented or non-segmented, as well as other elements used to correct, protect, or enhance vision, including without limitation contact lenses, intra-ocular lenses, magnifying lenses and protective lenses or visors such as found in spectacles, glasses, goggles and helmets. The optical device of the present invention is preferably an ophthalmic lens and more preferably a corrective or non-corrective ophthalmic lens designed to be used in spectacles, glasses, goggles and helmets. In a specific embodiment, the optical device of the invention is a semi-finished ophthalmic lens.

The optical device may be a tinted optical device, a polarized optical device, or an uncoated optical device.

The optical device may comprise a first surface, for instance a front surface, a second surface, for instance a back surface, and a peripheral surface joining the front and back surface.

A cosmetic defect is a defect having an impact on a visual aspect of the optical device.

A cosmetic defect may be an extended defect such as a scratch, a spread defect, a varnish drop, a varnish wave, an internal defect, a polarized mark, or a concentric streak.

A cosmetic defect is a defect formed during a previous processing or handling step, and may be a point defect such as a fiber, a dirty insert, a handling scratch, a water mark, a crater, a black point, a dust. . . .

The method for evaluating cosmetic defects of an optical device comprises a first set of cosmetic defects acquisition step S10, a second set of cosmetic defects acquisition step S20, a subset of cosmetic defects determining step S30, and a quality factor determining step S80.

During the first set of cosmetic defects acquisition step also called first acquisition step S10, a first set of cosmetic defects of the optical device is acquired. The first set of cosmetic defects may be acquired from an image of the optical device.

During the second set of cosmetic defects acquisition step also called second acquisition step S20, a second set of cosmetic defects of the optical device is acquired. The second set of cosmetic defects may be acquired from an image of the optical device.

The first acquisition step S10 and the second acquisition step S20 may be carried on in any order one relative to the other.

In the sense of the invention, an acquisition step is a step during which a set of cosmetic defects of the optical device is acquired, for example, a set of cosmetic defects is acquired by measurement on at least a part of the optical device, for example a face of the optical device thanks to measurement means. According to another example, a set of cosmetic defects is acquired by post-processing of an image previously acquired of the optical device. According to another example, a set of cosmetic defects is acquired by reception of data relating to a set of cosmetic defects from a distant entity, the cosmetic defects of said set being detected by measurement on at least a part of the optical device, for example a face of the optical device thanks to measurement means or by post-processing of an image previously acquired of the optical device.

Thus, within the meaning of the invention, the first acquisition step S10 and the second acquisition step S20 are distinct from each other. In other words, the first set of cosmetic defects and the second set of cosmetics defects are acquired, for example, from two different measurement means of the optical device or from two different post-processing of a same image of the optical device. Nevertheless, according to the invention, the first set of cosmetic defects and the second set of cosmetics defects could not be obtained simply by two or more types of classification or sorting of a same initial set of cosmetic defects detected on the optical device, for example as a function of their position on the optical device or of their intensity on an image of the optical device, from a same initial set of cosmetic defects detected on the optical device.

The second set of cosmetic defects comprises at least one cosmetic defect corresponding to a cosmetic defect of the first set of cosmetic defects both associated to a "real"/"physical" cosmetic defects of the optical device. In other words, the intersection of the first set of cosmetic defects and the second set of cosmetic defects is not empty. The second set of cosmetic defects is different from the first set of cosmetic defects. The second set of cosmetic defects may be a subset of the first set of cosmetic defects.

During the subset of cosmetic defects determining step S30, a subset of cosmetic defects of the optical device is determined based on the comparison of the cosmetic defects of the second set of cosmetic defects with the cosmetic defects of the first set of cosmetic defects, for example by subtraction. In other words, the subset of cosmetic defects comprises the cosmetic defects of the first set of cosmetic defects which are not corresponding to cosmetic defects of the second set of cosmetic defects.

During the quality factor determining step S80, a quality factor of the optical device is determined based on the subset of cosmetic defects. The quality factor of the optical device may be computed. In particular, one quality factor is determined for the whole optical device.

The quality factor of the optical device may be intended to be compared with a predetermined quality factor threshold.

The predetermined quality factor threshold may be predetermined depending on the user's needs. Further, according to the user's needs, different steps of the method or different equipment for carrying out these steps of the method may be used.

Figure 2:
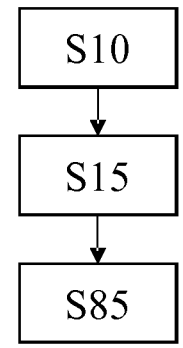

A flowchart of some steps of another embodiment of the method for evaluating cosmetic defects of an optical device according to the invention, which may also be implemented by computer means, is represented in FIG. 2.

The method comprises the first acquisition step S10, a cosmetic defects position differentiating step S15 and a quality factor determining step S85.

During the cosmetic defects position differentiating step S15, cosmetic defects of the first set of cosmetic defects are mapped and differentiated based on the position of cosmetic defects on the optical device. In particular, the cosmetic defects of the first set of cosmetic defects may be mapped and differentiated based on the position of cosmetic defects on the optical device with regard to at least two different zones of interest of the optical device. A zone of interest of the optical device may correspond to a zone where an optical lens is intended to be manufactured and/or machined on the optical device.

During the quality factor determining step S85, a quality factor of the optical device is determined based at least on the position of the cosmetic defects on the optical device. In particular, one quality factor is determined for the whole optical device. The quality factor of the optical device may be intended to be compared with a predetermined quality factor threshold.

Figure 3:
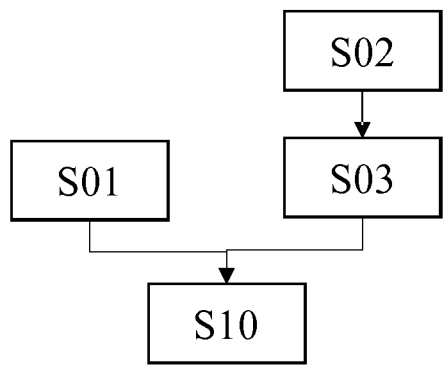

As illustrated in FIG. 3, the method may comprise an optical device image providing step S01, previous to the first set of cosmetic defects acquisition step S10. During the optical device image providing step S01, at least one image of the optical device is provided. During the first set of cosmetic defects acquisition step S10, the first set of cosmetic defects may be acquired on the provided image of the optical device. During the second set of cosmetic defects acquisition step S20, the second set of cosmetic defects may be acquired on the provided image of the optical device.

Alternatively, the method may comprise, previous to the first set of cosmetic defects acquisition step S10, an optical device providing step S02 and an optical device image acquisition step S03. During the optical device providing step S02, an optical device is provided. During the optical device image acquisition step S03, at least one image of the optical device is acquired. During the first set of cosmetic defects acquisition step S10, the first set of cosmetic defects may be acquired on the acquired image of the optical. During the second set of cosmetic defects acquisition step S20, the second set of cosmetic defects may be acquired on the acquired image of the optical.

The image of the optical device is accurate enough that all the relevant cosmetic defects of the optical device appear. For example all cosmetic defects of a size greater than 10 µm may appear on the image of the optical device, or all cosmetic defects of a size greater than 5 µm, or even greater than 2 µm or 1 µm. If no cosmetic defects are identified in the optical device, the optical device is accepted. All the cosmetic defects of the first and second sets of cosmetic defects, and their position, are identified.

During the optical device image acquisition step S03, one image of the optical device may be acquired and processed into four images. Two images of the optical device may represent modulation, and two images of the optical device may represent phases. The four images may be combined into a combination image, from which the first set of cosmetic defects is acquired.

Figure 4:
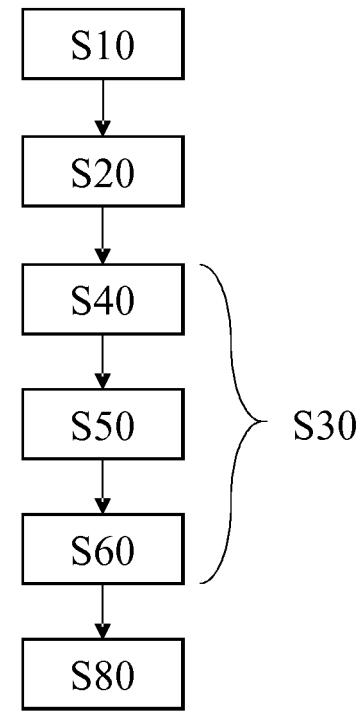

According to a first embodiment represented in FIG. 4, the method may comprise a cosmetic defects surface location differentiating step S40, during which cosmetic defects of the first and second sets of cosmetic defects are differentiated based on the location of cosmetic defects on the first and/or second surface of the optical device. In other words, the cosmetic defects surface location differentiating step S40 allows determining if the cosmetic defects are located on a specific surface of the optical device such that the front surface of the optical device or the back surface of the optical device.

The differentiation of the cosmetic defects of the first and second sets of cosmetic defects based on the location of cosmetic defects on the first and/or second surface of the optical device may be realized with measurements on the optical device. For example, the acquisition of the second set of cosmetic defects is set to acquire or determine only cosmetic defects present on one of the surfaces of the optical device, hereafter observed surface. By comparing the second set of cosmetic defects with the first set of cosmetic defects, it is possible to acquire or determine a subset of the first set of cosmetic defects corresponding to the cosmetic defects which are not on the observed surface, i.e. which are present on the other surface or within the bulk of the optical device.

The second set of cosmetic defects may comprise only cosmetic defects located on one of the first or second surfaces, for instance, only the back surface of the optical device.

The subset of cosmetic defects may be determined based on the comparison of the differentiated cosmetic defects of the second set of cosmetic defects with the differentiated cosmetic defects of the first set of cosmetic defects, for example by subtraction. In other words, the subset of cosmetic defects may be determined taking into account the location of the cosmetic defects on the front or back surface of the optical device.

For instance, the back surface of the optical device may be inspected to provide information relative to cosmetic defects on the back surface of the optical device. This inspection allows obtaining a second set of cosmetic defects. For example, the information relative to the cosmetic defects on the back surface of the optical device may be obtained using a different analysis tool, or imaging device or imaging protocol than the one used for the first set of cosmetic defects acquisition step S10.

The position of the cosmetic defects detected on the back surface of the optical device is compared with the position of all the cosmetic device detected. In other words, the cosmetic defects of the second set of cosmetic defects is compared with the cosmetic defects of the first set of cosmetic defects. The cosmetic defects which are colocalized on the first and second images are identified so as to form a subset of cosmetic defects comprising only cosmetic defects located on the first surface of the optical device, namely so as to form, by subtraction, a subset of cosmetic defects that does not comprise the colocalized cosmetic defects, i.e. so as to form, out of the first set of cosmetic defects, a subset of cosmetic defects which do not comprise the cosmetic defects present on the first surface.

For instance, on a semi-finished optical lens, cosmetic defects located on the back surface may be accepted, since, during the manufacturing of spectacle lenses, the back surface of a semi-finished optical lens is intended to be manufactured or machined. Contrarily cosmetic defects located on the front surface or internal cosmetic defects will generally still be present in the final finished optical lens and thus may not be accepted.

Indeed, on a finished optical lens, cosmetic defects located either on the back surface or on the front surface or internal cosmetic defects will be visible and will impact the cosmetic quality of the lens. Accordingly such cosmetic defects will often not be accepted.

In order to identify if the cosmetic defects are located on the front or back surface of the optical device, different systems may be used depending on the curvature of the back surface of the optical device. A system comprising for instance, a camera and a light-emitting diode (LED) may be used by specifically positioning it with regard to the back surface of the optical device, so as to provide a second set of cosmetic defects, for example by backside imaging or backside reflection or reflectometry.

In a second embodiment represented in FIG. 4, the method may comprise a cosmetic defects type differentiating step S50, during which cosmetic defects of the first and second sets of cosmetic defects are differentiated based on the type of cosmetic defects of the optical device. In particular, the cosmetic defects type differentiating step S50 allows determining the cosmetic defects that can be removed easily from the optical device, for instance by cleaning the optical device, from those that cannot be removed from the optical device.

The second set of cosmetic defects may comprise only cosmetic defects of a predetermined type of cosmetic defects, for instance dusts.

The differentiation of the cosmetic defects of the first and second sets of cosmetic defects based on the type of cosmetic defects of the optical device may be realized with image processing and/or with measurements on the optical device.

The subset of cosmetic defects may be determined based on the comparison of the differentiated cosmetic defects of the second set of cosmetic defects with the differentiated cosmetic defects of the first set of cosmetic defects, for example by subtraction. In other words, the subset of cosmetic defects may be determined taking into account the type of the cosmetic defects of the optical device.

For instance, the first surface of the optical device may be inspected, using fluorescence, to identify the cosmetic defects corresponding to dust. The optical device is irradiated with a ultra-violet (UV) light. Thus, the dusts present on the optical device are excited in the UV spectral zone and emit in the visible spectral zone. This inspection allows obtaining a second set of cosmetic defects corresponding to traces of dust. The position of the cosmetic defects which are dusts is then compared with the position of the cosmetic defects of the first set of cosmetic defects. The cosmetic defects colocalized within the first set of cosmetic defects and the second set of cosmetic defects are identified so as to form a subset of cosmetic defects comprising only cosmetic defects which are not dusts. For example, if all the cosmetic defects are dusts, the optical device may be accepted.

In a variation of said second embodiment, the surfaces of the optical device may be inspected to identify the cosmetic defects which are removable cosmetic defects. Such inspection may be done, for example by a specific imaging step or by an image analysis of the shape and size of the cosmetic defects of the first set of cosmetic defects, so as to obtain a second set of cosmetic defects corresponding to cosmetic defects determined to be removable cosmetic defects.

Removable cosmetic defects, namely cleanable cosmetic defects, may relate to a fiber on the optical device, a dust on the optical device, a water mark on the optical device, a varnish wave on the optical device, a varnish drop on the optical device, or a spread defect on the optical device. For instance, if all the cosmetic defects are removable cosmetic defects, the optical device may be accepted.

Cosmetic defects of the optical device which are irremovable cosmetic defects, namely cosmetic defects that cannot be cleaned, may relate to a scratch on a surface of the optical device, an internal defect of the optical device, a dirty insert on the optical device, a handling scratch on the optical device, a crater on the optical device, a black point on the optical device, a concentric streak on the optical device, a polarized mark on the optical device, or a spread defect on the optical device. For instance, if the front surface of the optical device comprises irremovable cosmetic defects, the optical device may be refused.

In a variation of previous variations of the second embodiment, the cosmetic defects type differentiating step S50 may be activated only on one of the front surface or the back surface of the optical device. In particular, in the case of a semi-finished lens, the cosmetic defects type differentiating step S50 may be initiated only for the front surface, by taking into account that the cosmetic defects present on the back surface may be identified according to the first embodiment of the invention, whether they are removable cosmetic defects or not.

The differentiation of the cosmetic defects of the first and second sets of cosmetic defects based on the location of cosmetic defects on the first and/or second surface of the optical device and the differentiation of the cosmetic defects of the first and second sets of cosmetic defects based on the type of cosmetic defects of the optical device may be realized using different part of a machine. More precisely, the optical device may move from one part of the machine realizing the differentiation of the cosmetic defects based on the location of cosmetic defects on the first and/or second surface of the optical device to another part of the machine realizing the differentiation of the cosmetic defects based on the type of cosmetic defects of the optical device. Alternatively, the two differentiation steps may use two different sensors or two different imaging processes, and both processes or sensors may be used one after the other on the optical device without moving it.

The cosmetic defects surface location differentiating step S40 and the cosmetic defects type differentiating S50, corresponding to two embodiments of the invention, may be applied to a same optical device one after the other, in one order or in reverse order, forming an initial differentiation step and a following differentiation step. Accordingly, in such case, the second set of cosmetic defects of the following differentiation steps is compared either to the first set of cosmetic defects, comprising all cosmetic defects measured initially, both differentiation steps acting thus in fact as parallel differentiation steps, or to the subset of cosmetic defects resulting from the initial differentiation step, both differentiation steps being thus applied in series. For instance, in FIG. 4, the cosmetic defects surface location differentiating step S40 is carried on before the cosmetic defects type differentiating S50. The cosmetic defects type differentiating S50 may be carried on before the cosmetic defects surface location differentiating step S40.

This reasoning holds true for the embodiments of the invention described below, which can be applied directly in combination with the first or second embodiment or in place of those. Thus, while the text above and below is expressed using only the word "first set of cosmetic defects", "second set of cosmetic defects" and "subset of cosmetic defects", the invention is also thus that those respective wordings can be understood, when needed, as "previously determined subset of cosmetic defects", "additional second set of cosmetic defects" and "new subset of cosmetic defects". Thus the person skilled in the art understand that within reason, depending on the order of use of the embodiments, it might be useful to use any of the following terms: "previously determined first subset of cosmetic defects", "third set of cosmetic defects" and "second subset of cosmetic defects", or "previously determined second subset of cosmetic defects", "fourth set of cosmetic defects" and "third subset of cosmetic defects", or "previously determined third subset of cosmetic defects", "fifth set of cosmetic defects" and "fourth subset of cosmetic defects". . . .

Alternatively, those embodiments may be used in parallel, and thus the process would comprise a consolidating step, for which the subset of cosmetic defects outputted by each subset of cosmetic defects determining step are compared, and further subsets of cosmetic defects may be determined depending on the different level of colocalization of the cosmetic defects.

In a third embodiment represented in FIG. 4, the method may comprise a cosmetic defects position differentiating step S60, during which cosmetic defects of the first and second sets of cosmetic defects are differentiated based on the position of cosmetic defects on the optical device. In other words, the cosmetic defects position differentiating step S60 allows determining in which zone of the optical device the cosmetic defects are.

As stated above and as written below, the cosmetic defects position differentiating step S60 may be applied directly to the first set of cosmetic defects or alternatively, it may be applied to any of the subsets of cosmetic defects determined using the embodiments of the invention described above.

For instance, in FIG. 4, the cosmetic defects surface location differentiating step S40 and the cosmetic defects type differentiating S50 are carried on before the cosmetic defects position differentiating step S60. The cosmetic defects surface location differentiating step S40, the cosmetic defects type differentiating S50 and the cosmetic defects position differentiating step S60 may be carried on in any order one relative to each other.

As represented in FIG. 5, the optical device 10 is virtually divided into a plurality of zones, for example four zones. In the described example, a fourth zone, noted Z4, corresponds to the periphery of the optical device and extends over an area from the edge of the optical device until a distance comprised between 1 mm and 3 mm, for instance 1.5 mm, from the edges of the optical device. A third zone, noted Z3, extends over an area from the fourth zone Z4 until a distance comprised between 5 mm and 10 mm, for instance 5 mm, inside the fourth zone Z4. A second zone, noted Z2, is arranged between a first zone Z1 and the third zone Z3. The first zone, noted Z1, corresponds to the center of the optical device 10 and extends over an area centered around an optical center of the optical device 10 with a diameter comprised between 25 mm and 35 mm, for instance around 30 mm. In FIG. 5, the optical device comprises four zones Z1 to Z4 represented with a circular shape. Of course, the third embodiment of the invention may apply to the optical device virtually divided into a different number of zones, such as two, three or five or six, which can have different shapes than the ones cited above.

The cosmetic defects position differentiating step S60 allows determining if the cosmetic defects are at the center of the optical device, here within the first zone Z1, or near the periphery of the optical device, here within the third zone Z3. Furthermore, the present example of the cosmetic defects position differentiating step S60 allows determining if the cosmetic defects are near the center of the optical device, namely on the second zone Z2, on the periphery of the optical device, namely on the fourth zone Z4.

The differentiation of the cosmetic defects of the first set of cosmetic defects based on the position of cosmetic defects of the optical device may be realized with image processing. Here, it is thus understood that the invention may be described otherwise as determining three positioning sets of cosmetic defects corresponding to three zones and obtaining a fourth subset of cosmetic defects by comparing the first set of cosmetic defects to the three positioning sets of cosmetic defects.

Alternatively, it can be understood as applying successively for each zone, the comparison of the first set of cosmetic defects to a second set of cosmetic defects corresponding to the cosmetic defects presents within said zone. In this case, the second set of cosmetic defects may comprise only cosmetic defects positioned on a predetermined zone of the optical device, for instance on the peripheral zone of the optical device. And the subset of cosmetic defects may be determined based on the subtracting of the differentiated cosmetic defects of the second set of cosmetic defects from the differentiated cosmetic defects of the first set of cosmetic defects. In other words, the subset of cosmetic defects may be determined taking into account the position of the cosmetic defects of the optical device.

According to the previously illustrated embodiments of the invention, the method allows obtaining the number of cosmetic defects, their position and their size, for example presented using one image, result of the cosmetic defects detection.

The position of the cosmetic defects on the optical device may be determined relative to the optical center of the optical device, or relative to the geometrical center of the optical device, or relative to a prismatic reference point of the optical device.

If the optical device comprises markings, the position of the cosmetic defects on the optical device may be determined relative to the markings on the optical device.

If the optical device is positioned on a blocking device, for instance for the acquisition of an image of the optical device, the position of the cosmetic defects on the optical device may be determined relative to a reference center of the blocking device.

The optical device may be intended to be manufactured and/or machined into an optical lens, and intended to be mounted on a frame. For instance, the shape of an optical device 10 edged to the shape of the frame F is represented in dotted lines in FIG. 5.

As represented in FIG. 6, the method may comprise a frame data providing step S70. During the frame data providing step S70, frame data relative to the position on the optical device of the shape of the optical device edged to the shape of the frame on which the optical lens is intended to be mounted are provided. During the frame data providing step S70, frame data relative to the shape of the frame on which the optical lens is intended to be mounted are provided.

The subset of cosmetic defects of the optical device may be determined based on the frame data. In a variant of the third embodiment, two of the zones of the optical device, which may each overlap with one or more of the other zones, may correspond respectively to the part of the optical device determined to be outside of the ophthalmic lens edged to the shape of the frame, and to the part of the optical device determined to be inside of the ophthalmic lens edged to the shape of the frame.

For instance, on a finished optical lens, cosmetic defects located inside the frame shape may not be accepted, whereas cosmetic defects located outside the frame shape may not be considered, or considered as having a lesser gravity or lesser impact on the cosmetic quality of the lens.

Each cosmetic defect of the subset of cosmetic defects may be associated with a severity score. The quality factor of the optical device may be the sum of the severity score of the cosmetic defects of the subset of cosmetic defects, or may be a ponderation or multiplication of the severity score of the cosmetic defects of the subset of cosmetic defects.

The individual severity score of a cosmetic defect may depend on the location of the cosmetic defects on the first and/or second surfaces of the optical device, determined using the cosmetic defects surface location differentiating step S40, on the position of the cosmetic defects on the optical device with regard to the different zones of the optical device based for example on the cosmetic defects position differentiating step S60, on the size of the cosmetic defects of the optical device, on the type of the cosmetic defects of the optical device, on the removable aspect of the cosmetic device determined using the cosmetic defects type differentiating step S50, on the shape of the cosmetic defects of the optical device, on the intensity of the cosmetic defects of the optical device, or on the number of cosmetic defects of the optical device. In some cases, for cosmetic defects identified on the back surface of a semi-finished lens, or for removable defects, or in some cases for defects considered to be situated outside of the ophthalmic lens edged to the shape of the frame, the cosmetic defects may be removed from the calculation of the quality score of the lens. Alternatively, the severity score of those cosmetic defects may be put to zero, or any other eliminating score.

The acceptance or rejection of a cosmetic defect may be done based on the comparison of the computed severity score of the cosmetic defect with a predetermined severity score threshold. For instance, below the predetermined severity score threshold, the cosmetic defect is considered as acceptable.

Alternatively a more discrete acceptance step may be done, determining multiple threshold or criterions, having some score value leading to a full acceptance, some score value leading to a full rejection, and some score values leading to further evaluations.

Moreover, the acceptance or rejection of the optical device may be done based on the comparison of the computed quality factor of the optical device with a predetermined quality factor threshold, the quality factor of the optical device depending on the severity score of the cosmetic defects. For instance, below the predetermined quality factor threshold, the optical device is considered as acceptable.

For instance, a cosmetic defect positioned on the front surface of the optical device may have a higher severity score than the same cosmetic defect positioned on the back surface of the optical device, which severity score can be a minimum or null severity score, when a higher severity score of the cosmetic defect indicates that the cosmetic defect is more prejudicial for the cosmetic quality of the optical device. For example, for semi-finished lenses, the cosmetic defects on the back-surface may be inputted with a severity score of zero or may be removed from the analysis, or the analysis may be performed only on a subset of cosmetic defects formed by applying the first embodiment of the invention, i.e. the cosmetic defects surface location differentiating step S40.

Moreover, a cosmetic defect positioned on the center of the optical device may have a higher severity score than the same cosmetic defect positioned on the periphery of the optical device, when a higher severity score of the cosmetic defect indicates that the cosmetic defect is more prejudicial for the cosmetic quality of the optical device.

For example, a cleanable cosmetic defect of the optical device may have a lower severity score than an internal cosmetic defect on the optical device, when a higher severity score of the cosmetic defect indicates that the cosmetic defect is more prejudicial for the cosmetic quality of the optical device. For example, the removable cosmetic defects, and in particular cosmetic defects identified as dusts, may be inputted with a severity score of zero or may be removed from the analysis, or the analysis may be performed only on a subset of cosmetic defects formed by applying the second embodiment of the invention, i.e. the cosmetic defects type differentiating step S50.

Furthermore or alternatively, the optical device may be virtually divided into zones, as represented in FIG. 5, and the method may comprise, for each zone of the optical device, a quality score determining step S90. In FIG. 7, the quality score determining step S90 is represented alternatively to the quality factor determining step S80. During the quality score determining step S90, for each zone of the optical device, a quality score of the zone of the optical device is determined based on the cosmetic defects of the zone of the optical device. The quality score of the zone of the optical device is intended to be compared with a predetermined quality score threshold associated with said zone. More precisely, in a given variant one quality score for each zone of the optical device may be computed, each being compared to a predetermined quality score specific to each zone.

Accordingly, the quality score of the zone of the optical device may depend on the size of the individual cosmetic defects of the optical device present within said zone, on the type of the cosmetic defects of the optical device present within said zone, on the shape of the cosmetic defects of the optical device present within said zone, on the intensity of the cosmetic defects of the optical device present within said zone, or on the number of cosmetic defects of the optical device present within said zone.

The different zones may have different criterion relative to the number of cosmetic defects on the zone of the optical device, to the size of the cosmetic defects on the zone of the optical device, and to the intensity of the cosmetic defects on the zone of the optical device. Different severity score may be applied to same cosmetic defects depending on the zone of the optical device comprising the cosmetic defect.

In other words, the optical device may be virtually divided into zones, as represented in FIG. 5, and the method may comprise, determining a quality score independently for each zone of the optical device based on the severity scores of the individuals cosmetic defects present in each zone, and comparing the computed quality score of each zone to a predetermined threshold value specific to each zone.

For instance, the quality score of the first zone Z1 of the optical device 10 may be greater than the quality score of the third zone Z3 of the optical device even in the case where each zone have exactly the same types of cosmetic defects, in the same number and of same size, when a higher quality score indicates a lower cosmetic quality of the optical device.

Alternatively or in combination, the optical device may be virtually divided into zones, as represented in FIG. 5, and the method may comprise inputting, for each zone of the optical device, a weight to the severity score of the cosmetic defects present within each zone, said weight being specific for each zone and computing a global quality factor for the whole optical device based on the individual quality scores of the zones of the optical device or on the individual severity scores of the cosmetic defects of the whole optical device and comparing said global quality factor to a global quality factor threshold.

Thus, in accordance to the above and as represented in FIG. 6, the method may comprise a cosmetic defects number determining step S100, during which the number of cosmetic defects of the optical device is determined. In particular, the number of cosmetic defects of the subset of cosmetic defects may be specifically computed without counting the cosmetic defects of the second sets of cosmetic defects determined in the first and/or second embodiment of the invention.

The quality factor depends on the determined number of cosmetic defects of the optical device or/and on the determined number of at least one zone of the optical device and/or on the determined number of cosmetic defects correlated with the zone of the cosmetic defects.

The quality factor of the optical device may depend on the determined number of cosmetic defects of the subset of cosmetic defects of the optical device. When the quality factor of the optical device is intended to be compared with a predetermined quality factor threshold, the predetermined quality factor threshold may depend on the determined number of cosmetic defects of the subset of cosmetic defects of the optical device.

A maximum number of cosmetic defects may be authorized for an optical device, or for a given zone of the optical device.

As represented in FIG. 6, the method may further comprise a cosmetic defects cluster determining step S110, during which, having been inputted a predetermined distance value, the number of cosmetic defects of the optical device closer from each other than said distance value is determined. In particular, the number of cosmetic defects of the subset of cosmetic defects closer from each other than said distance value may be determined. In other words, the cosmetic defects cluster determining step S110 allows determining if there are clusters of cosmetic defects on the optical device. Alternatively a predetermined area size can be set, and the clusters of cosmetic defects are determined by identifying the areas having the predetermined area size, which contain multiple cosmetic defects.

The quality factor of the optical device may indeed depend on the determined number of cosmetic defects of the subset of cosmetic defects of the optical device. In this case, the quality factor of the optical device is intended to be compared with a predetermined quality factor threshold, the predetermined quality factor threshold may depend on the determined number of cosmetic defects of the subset of cosmetic defects of the optical device.

For instance, considering two similar cosmetic defects localized close to each other, each cosmetic defect has an individual severity score, for instance a severity score of 4. However, if the two cosmetic defects are considered as a cluster of cosmetic defects, the cluster of cosmetic defects may be inputted with a higher severity score than each cosmetic defect considered alone, for instance a severity score of 6. Indeed, small defects are often perceived as impacting more the visual cosmetic quality of an object if the cosmetic defects are located close to each other than if they are spread out. If the predetermined quality factor threshold is set greater than the severity score of each cosmetic defect considered alone and lower than the severity score of the cluster of cosmetic defects, for instance a predetermined quality factor threshold of 5, the optical device with spread out cosmetic defects would be accepted while the optical device with a cluster of such cosmetic defects would be rejected.

When the optical device is an optical lens, the optical device may comprise markings, such as micro-circles on the nasal and temporal side of the optical device. The markings are not considered as cosmetic defects, but may be detected as cosmetic defects when the first set of cosmetic defects is acquired or when the second set of cosmetic defects is acquired.

As represented in FIG. 6, the method may comprise a markings acquisition step S120, during which markings of the optical device are identified, for example by analysis of the first set of cosmetic defects.

The first set of cosmetic defects of the optical device may be determined anew based on the subtracting of the markings of the optical device from the cosmetic defects of the first set of cosmetic defects.

Figure 8:
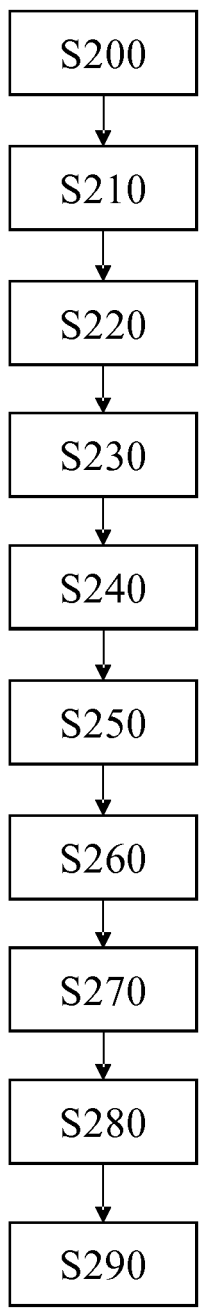
FIG. 8 is a flowchart of the different steps of a method for sorting an optical device according to the invention.

The invention further relates to a method for sorting an optical device. The method may be implemented by computer means. A flowchart of the different steps of the method for sorting an optical device according to the invention is represented in FIG. 8. In an embodiment, the method for sorting an optical device as represented in the flowchart of FIG. 8, is applied to a subset of cosmetic defects resulting from having applied the first embodiment of the invention and/or the second embodiment of the invention, and having removed or assigned excluding severity scores to cosmetic defects present on the back surface of a semi-finished lens and/or to removable cosmetic defects.

The method comprises a predetermined quality factor threshold providing step S200, a quality factor determining step S210, a comparing step S220 and a first sorting step S230.

During the predetermined quality factor threshold providing step S200, a predetermined quality factor threshold is provided.

The predetermined quality factor threshold may be determined according to the method for evaluating cosmetic defects of an optical device as described previously. More precisely, the predetermined quality factor threshold may be fixed with an arbitrary value and may be updated during the method for evaluating cosmetic defects of an optical device.

During the quality factor determining step S210, a quality factor of an optical device is determined according to the method for evaluating cosmetic defects of an optical device as described previously.

During the comparing step S220, the quality factor of the optical device is compared with the predetermined quality factor threshold.

During the first sorting step S230, the optical device is sorted based on the comparison of the quality factor of the optical device and the predetermined quality factor threshold.

The method may comprise a first decision step S240, during which a decision is stated if the optical device is accepted or rejected.

For instance, if the quality factor of the optical device is below the predetermined quality factor threshold, the optical device is considered as acceptable.

It is to be noted that the steps needed and their order of application may be adapted to the specific needs of the user or customer using the process of the invention. On specific cases, a human operator may also accomplish some of the steps, for example a final control or determining if the optical devices passes or fails.

The method may further comprise an optical lens virtual position determining step S250, during which a virtual position of an optical lens to be manufactured and/or machined, having a shape adapted to be fitted in a predetermined frame, is determined on the optical device based on the determined cosmetic defects on the optical device.

Figure 9:
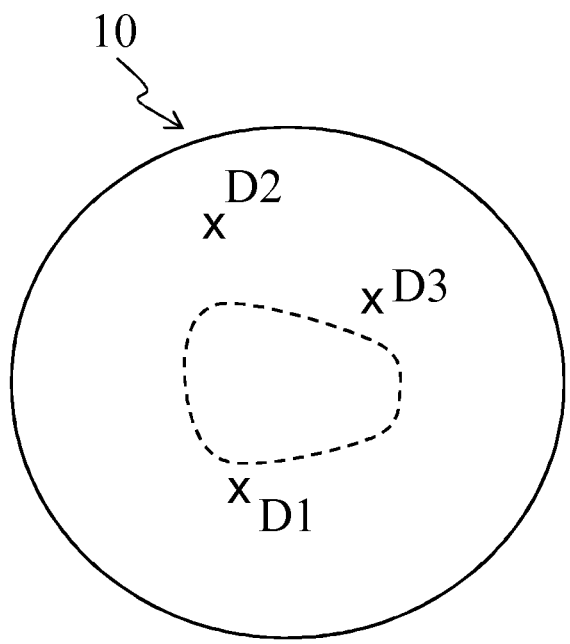
FIG. 9 represents an optical device with a virtual position of an optical lens to be manufactured and/or machined on the optical device.

As illustrated in FIG. 9, a virtual position, represented in dotted line, of an optical lens to be manufactured and/or machined, having a shape adapted to be fitted in a predetermined frame, may be determined on an optical device comprising cosmetic defects which led to determining a quality score that is not acceptable. More precisely according to this embodiment of the invention, the virtual position of the optical lens, having a shape adapted to be fitted in a predetermined frame, is determined by taking into account the position and the severity score of the cosmetic defects. As such, the optical lens virtual position determining step S250 may comprise calculating if a rotation and/or a translation of the optical lens having a shape adapted to be fitted in a predetermined frame would enable to determine a position of said lens for which a severity score of the cosmetic defects present within the shape adapted for the optical lens to be fitted in a predetermined frame is lower than a given threshold. For instance, a program loaded on a computer may calculate the position and orientation of the optical lens having a shape adapted to be fitted in a predetermined frame, within the optical device which minimizes the quality factor of the optical device. Then, the obtained quality factor of the optical device is compared with the predetermined quality factor threshold.

In such case, the cosmetic defects position differentiating step may be re-calculated based on the optical lens shape and basing the zones on the calculated optical center of the optical lens having a shape adapted to be fitted in a predetermined frame instead of basing the zones on the optical center of the optical device.

In FIG. 9, the optical device 10 comprising three cosmetic defects, noted D1 to D3, which are not acceptable, namely that have a severity score above the predetermined severity score threshold. An optical lens may be virtually positioned in the optical device by taking into account the position of the unacceptable cosmetic defects, namely by avoiding the zones of the optical device comprising the unacceptable cosmetic defects for positioning the optical lens.

The method may comprise a second sorting step S260, during which the optical device is sorted based on the determined virtual position of the optical lens to be manufactured and/or machined on the optical device.

The method may comprise a second decision step S270, during which a decision is stated if the optical device is accepted or rejected.

The decision if the optical device is accepted or rejected may be manually stated. In other words, a user of a device for evaluating cosmetic defects of an optical device may state if the optical device should be accepted or rejected. The user of the device may state if the optical device should be accepted or rejected based on the result images of the optical device and/or on the calculated severity scores, quality scores and/or quality factors.

In an alternative, the first decision step S240 may be done simultaneously with the second decision step S270 in a single decision step which would then be based on both the results of the first sorting step S230 and the results of the second sorting step S260. In other alternative modes, the method comprises only one of the first sorting step S230 and of the second sorting step S260.

The decision if the optical device is accepted or rejected may be automatically stated. In other words, a device for evaluating cosmetic defects of an optical device may state if the optical device should be accepted or rejected based on the result images of the optical device and/or on the calculated severity scores, quality scores and/or quality factors.

For instance, if an ophthalmic lens may be manufactured and/or machined on the optical device, the optical device may be considered as acceptable, even if a quality factor higher than the acceptable quality factor threshold has been measured. This embodiment of the invention can be particularly useful either when the customer is more interested in being able to produce the required ophthalmic lens, without putting negative value on the cosmetic aspects of the non-usable parts, or when the edging of the optical device so obtain an ophthalmic lens, having a shape adapted to be fitted in a predetermined frame, is done within a manufacture plant, for instance the same manufacture plant as the one producing the optical device.

The invention further relates to a method for manufacturing an optical device, the method comprising the steps of a method for sorting an optical device according to the preceding and as previously described.

The method further comprises an optical device positioning step S280 and a machining and/or surfacing step S290.

During the optical device positioning step S280, the sorted optical device is positioned on a blocking device for machining and/or surfacing based on the determined virtual position of an optical lens to be manufactured and/or machined on the optical device.

During the machining and/or surfacing step S290, the positioned sorted optical device is machined and/or surfaced according to the determined virtual position of an optical lens to be manufactured and/or machined on the optical device.

The positioning of the sorted optical device may be a 2-Dimensional or a 3-Dimensional positioning.

The invention further relates to a machine for managing cosmetic defects on an optical device.

Figure 10:
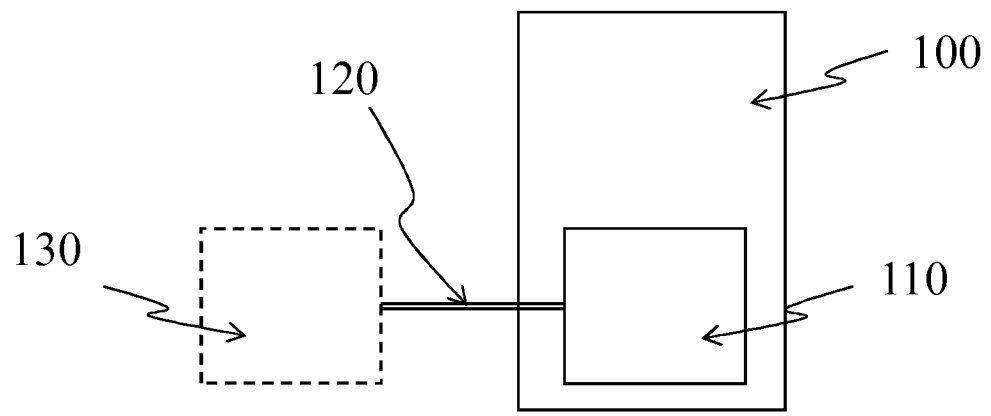
FIG. 10 represents a machine for managing cosmetic defects on an optical device according to the invention.

As represented in FIG. 10, the machine 100 comprises an optical device cosmetic defect acquisition module 110. The optical device cosmetic defect acquisition module 110 is configured to acquire a first set of cosmetic defects and/or a second set of cosmetic defects of an optical device.

The machine may comprise a link 120 with an analytical module 130 configured to apply the method for evaluating cosmetic defects of an optical device as described previously or the method for sorting an optical device as described previously. The machine may comprise the analytical module 130.

The invention further relates to a system for managing cosmetic defects on an optical device.

Figure 11:
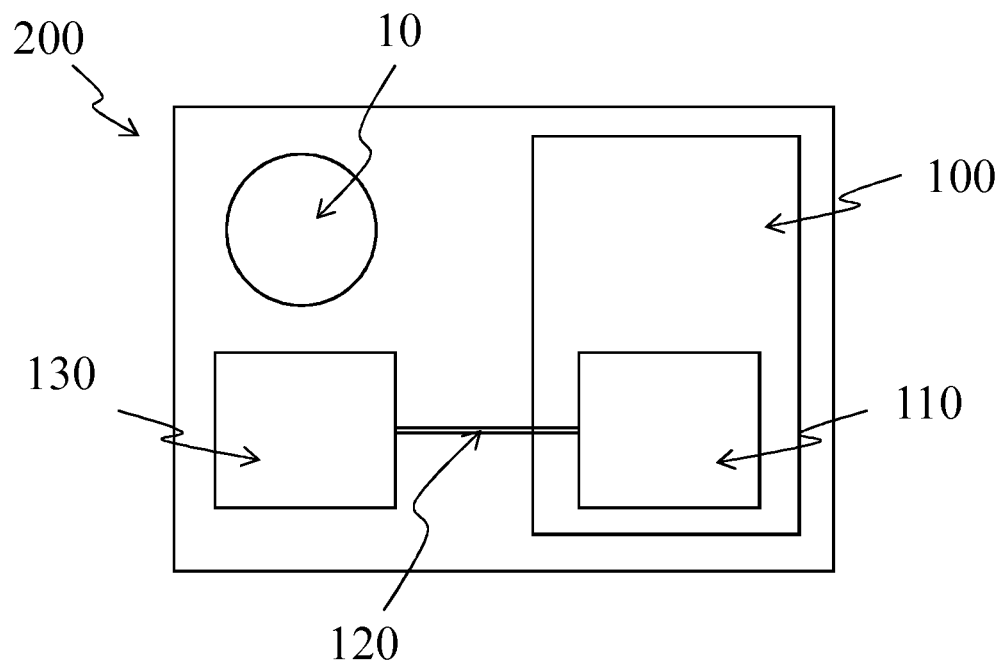
FIG. 11 represents a system for managing cosmetic defects on an optical device according to the invention.

As represented in FIG. 11, the system comprises an optical device 10, a machine 100 comprising an optical device cosmetic defect acquisition module 110 and an analytical module 130.

The optical device cosmetic defect acquisition module 110 is configured to acquire a first set of cosmetic defects and/or a second set of cosmetic defects of the optical device.

The analytical module 130 is configured to apply the method for evaluating cosmetic defects of an optical device as described previously or the method for sorting an optical device as described previously.

The analytical module 130 is adapted to determine a quality factor of the optical device.

The invention has been described above with the aid of embodiments without limitation of the general inventive concept. Moreover, the embodiments of the invention may be combined without any restriction.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for evaluating cosmetic defects of an optical device, the method comprising:
    acquiring a first set of cosmetic defects of the optical device;
    acquiring a second set of cosmetic defects of the optical device, the second set of cosmetic defects being different from the first set of cosmetic defects and comprising at least one cosmetic defect corresponding to a cosmetic defect of the first set of cosmetic defects;
    determining a subset of the first set of cosmetic defects of the optical device based on a comparison of the cosmetic defects of the second set of cosmetic defects and the cosmetic defects of the first set of cosmetic defects by subtraction; and
    determining a quality factor of the optical device based on the subset of cosmetic defects,
    wherein each of the cosmetic defects of the first and second sets of cosmetic defects are differentiated based on one or more of:
        (i) a location of the respective cosmetic defect on one of a first surface and a second surface of the optical device,
        (ii) a type of the respective cosmetic defect of the optical device, and
        (iii) a position of the respective cosmetic defect on the optical device.

2. The method according to claim 1, wherein, during the differentiating, the cosmetic defects of the first and second sets of cosmetic defects are differentiated with one or more of (i) image processing and (ii) measurements on the optical device.

3. The method according to claim 1, further comprising:
mapping and differentiating the cosmetic defects of the first set of cosmetic defects based on the position of the respective cosmetic defects on the optical device,
wherein the quality factor of the optical device is determined based at least on the position of the respective cosmetic defects on the optical device.

4. The method according to claim 1, wherein the optical device is divided into zones, and, for each of the zones of the optical device, further comprises:
determining a quality score of the zone of the optical device based on the cosmetic defects of the zone of the optical device.

5. The method according to claim 4, further comprising:
determining a number of cosmetic defects of the optical device,
wherein the quality factor depends on one or more of (i) the determined number of cosmetic defects of the optical device, (ii) a determined number of at least one zone of the optical device, and (iii) a determined number of cosmetic defects correlated with the zone of the cosmetic defects.

6. The method according to claim 1, wherein the optical device is a spectacle lens.

7. A method for sorting an optical device, the method comprising:
providing a predetermined quality factor threshold;
determining the quality factor of the optical device according to the method for evaluating cosmetic defects of the optical device according to claim 1;
comparing the quality factor of the optical device with the predetermined quality factor threshold; and
sorting the optical device based on the comparison of the quality factor of the optical device and the predetermined quality factor threshold.

8. The method according to claim 7, further comprising:
stating a decision as to whether the optical device is accepted or rejected.

9. The method according to claim 7, further comprising:
determining a virtual position of an optical lens, having a shape configured to be fitted in a predetermined frame, to be one or more of manufactured and machined on the optical device based on the determined cosmetic defects on the optical device;
sorting the optical device based on the determined virtual position of the optical lens to be one or more of manufactured and machined on the optical device; and
stating a decision as to whether the optical device is accepted or rejected.

10. The method according to claim 9, wherein during the stating the decision, the decision is manually stated.

11. A method for manufacturing an optical device, the method comprising:
the method for sorting the optical device according to claim 9,
positioning the sorted optical device on a blocking device configured to one or more of machine and surface based on the determined virtual position of the optical lens to be one or more of manufactured and machined on the optical device; and
one or more of machining and surfacing the positioned sorted optical device according to the determined virtual position of the optical lens.

12. A machine for managing cosmetic defects on an optical device, the machine comprising:
one or more processors configured to acquire one or more of (i) a first set of cosmetic defects of the optical device and (ii) a second set of cosmetic defects of the optical device; and
a link with the one or more processors configured to apply the method for evaluating cosmetic defects of the optical device according to claim 1.

13. A system for managing cosmetic defects on an optical device, the system comprising:
a machine comprising one or more processors configured to
acquire one or more of (i) a first set of cosmetic defects of the optical device and (ii) a second set of cosmetic defects of the optical device, and
apply the method for evaluating cosmetic defects of the optical device according to claim 1 and configured to determine the quality factor of the optical device.

14. The method according to claim 7, further comprising:
determining a virtual position of an optical lens, having a shape configured to be fitted in a predetermined frame, to be one or more of manufactured and machined on the optical device based on the determined cosmetic defects on the optical device; and
sorting the optical device based on the determined virtual position of the optical lens to be one or more of manufactured and machined on the optical device.

15. The method according to claim 1, wherein the optical device is an ophthalmic lens.

16. The method according to claim 1, wherein the optical device is a semi-finished lens.

* * * * *